(12) United States Patent
Matsumoto et al.

(10) Patent No.: US 10,090,709 B2
(45) Date of Patent: Oct. 2, 2018

(54) BIDIRECTIONAL NON-CONTACT POWER SUPPLY DEVICE AND BIDIRECTIONAL NON-CONTACT POWER SUPPLY SYSTEM

(71) Applicant: Mitsubishi Electric Corporation, Chiyoda-ku (JP)

(72) Inventors: Sadayuki Matsumoto, Chiyoda-ku (JP); Takuya Yabumoto, Chiyoda-ku (JP); Takayoshi Nagai, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/558,314

(22) PCT Filed: Sep. 4, 2015

(86) PCT No.: PCT/JP2015/075159
§ 371 (c)(1),
(2) Date: Sep. 14, 2017

(87) PCT Pub. No.: WO2016/151889
PCT Pub. Date: Sep. 29, 2016

(65) Prior Publication Data
US 2018/0062430 A1    Mar. 1, 2018

(30) Foreign Application Priority Data

Mar. 23, 2015 (JP) .................. 2015-058951

(51) Int. Cl.
*H02J 50/10* (2016.01)
*H02M 3/335* (2006.01)
(Continued)

(52) U.S. Cl.
CPC .............. *H02J 50/10* (2016.02); *H02J 7/025* (2013.01); *H02M 3/33584* (2013.01); *H02M 3/33592* (2013.01); *B60L 11/182* (2013.01)

(58) Field of Classification Search
CPC ...... H02J 50/10; H02J 7/025; H02M 3/33584; H02M 3/33592; B60L 11/182
See application file for complete search history.

(56) References Cited

U.S. PATENT DOCUMENTS 9,831,725 B2 * 11/2017 Tsai ..................... H02J 50/27
2012/0001589 A1 * 1/2012 Yeh ..................... H02J 5/005
320/108
(Continued)

FOREIGN PATENT DOCUMENTS

JP    2012-244635 A    12/2012
JP    2014-079107 A    5/2014
(Continued)

OTHER PUBLICATIONS

International Search Report dated Nov. 24, 2015 in PCT/JP2015/075159, filed on Sep. 4, 2015.

*Primary Examiner* — Daniel Kessie
(74) *Attorney, Agent, or Firm* — Oblon, McClelland, Maier & Neustadt, L.L.P.

(57) ABSTRACT

A bidirectional non-contact power supply device with its electric power transmission efficiency being high is obtained by a simple configuration. In the bidirectional non-contact power supply device, a coil is included for performing electric power transmission to and reception from another coil through a magnetic field coupling therebetween, and the coil and a capacitor being connected in series are connected on an input-output end of an inverter circuit, wherein a bidirectional buck-boost converter is connected between the inverter circuit and a DC power source (7).

5 Claims, 7 Drawing Sheets

(51) Int. Cl.
  *H02J 7/02*   (2016.01)
  *B60L 11/18*  (2006.01)

(56) References Cited

U.S. PATENT DOCUMENTS

| | | | | |
|---|---|---|---|---|
| 2014/0028110 A1* | 1/2014 | Petersen | ............... | H01F 38/14 |
| | | | | 307/104 |
| 2014/0152248 A1* | 6/2014 | Yeh | ............... | H02J 50/10 |
| | | | | 320/108 |
| 2015/0015197 A1* | 1/2015 | Mi | ............... | B60L 11/182 |
| | | | | 320/108 |
| 2016/0001662 A1* | 1/2016 | Miller | ............... | B60L 11/005 |
| | | | | 307/104 |
| 2016/0043562 A1* | 2/2016 | Lisi | ............... | H02J 5/005 |
| | | | | 307/104 |
| 2016/0176300 A1* | 6/2016 | Bucher | ............... | B60L 11/182 |
| | | | | 307/104 |

FOREIGN PATENT DOCUMENTS

| | | |
|---|---|---|
| JP | 2014-110662 A | 6/2014 |
| JP | 2014-110733 A | 6/2014 |

\* cited by examiner 10,090,709 B2

BIDIRECTIONAL NON-CONTACT POWER SUPPLY DEVICE AND BIDIRECTIONAL NON-CONTACT POWER SUPPLY SYSTEM

CROSS-REFERENCE TO RELATED APPLICATIONS

This application is the national stage entry of PCT/JP2015/075159 which was filed on Sep. 4, 2015. PCT/JP2015/075159 claims the benefit of priority to JP2015-058951which was filed on Mar. 23, 2015 . The entire contents of both PCT/JP2015/075159 and JP2015-058951 are hereby incorporated by reference.

BACKGROUND OF THE INVENTION

Field of the Invention

The present invention associates with non-contact power supply devices which perform electric power transmission and reception by means of their coils by utilizing a magnetic field coupling therebetween, and relates to a bidirectional non-contact power supply device functioning as an electric power transmission device and an electric power reception device, and to a bidirectional non-contact power supply system.

Description of the Related Art

A contactless or non-contact power supply device which supplies electric power from one coil to the other coil by utilizing coupling of a magnetic field therebetween generated by the one coil is considered as charging means to electric automotive vehicles, a household electric apparatus and the like. In recent years, by connecting coils in series or parallel with capacitors, an electric power supply is increasingly performed with high efficiency even when the distance between the coils through which electric power is transmitted and received is large in separation.

Attempts are being made where such a non-contact power supply is utilized not only for an electric power supply in one direction for charging an apparatus, but also for discharging from an apparatus having been charged to another apparatus.

For example in a conventional bidirectional non-contact power supply device which utilizes coupling of a magnetic field with another coil, capacitors are provided in series and parallel with a coil for performing electric power transmission and reception; and a switch is provided in parallel with the series-connected capacitor, and another switch, in series with the parallel-connected capacitor. According to this arrangement, it is so configured that, by selecting turn-on and turn-off of the switches, either one of a configuration in which a capacitor is connected only in series with the coil and a configuration in which another capacitor is connected only in parallel with the coil can be selected. And then, a thing in which the coil and the capacitors are connected in series and parallel therewith is connected to a full-bridge inverter circuit. The full-bridge inverter circuit operates as an inverter when electric power is supplied from the inverter circuit to a side of the coil, and operates as a diode bridge when electric power is supplied from the side of the coil to the inverter circuit. And then, another end of the full-bridge inverter circuit is connected to a bidirectional buck-boost converter, and its other end of the bidirectional buck-boost converter is connected to a DC power source. The bidirectional buck-boost converter is configured to operate as a step-up or boost chopper circuit when electric power is supplied from the DC power source to a side of the full-bridge inverter circuit, and, as a step-down or buck chopper circuit when electric power is supplied from the side of the full-bridge inverter circuit to the DC power source. In a conventional bidirectional non-contact power supply system, bidirectional non-contact power supply devices in the configurations described above are configured to form a pair.

And then, when a non-contact power supply is performed, one bidirectional non-contact power supply device operates as an electric power transmission device, and the other bidirectional non-contact power supply device, as an electric power reception device. When the operation as an electric power transmission device is ensued, a configuration is transferred in which a coil and a capacitor is connected in series with each other by changing over switches for selecting capacitors which are connected in series and parallel with the coil. And then, the bidirectional buck-boost converter inputs a voltage of the DC power source into the full-bridge inverter circuit, while maintaining the voltage as it is, or after having performed voltage regulation on an as-needed basis. A DC voltage from the DC power source is converted by means of the full-bridge inverter circuit into an alternating current, which is supplied to a coil and a capacitor connected in series with each other. Meanwhile, when the operation as an electric power reception device is ensued, a configuration is transferred in which a coil and another capacitor is connected in parallel with each other by changing over switches for selecting capacitors which are connected in series and parallel with the coil. Electric power received by a coil and a capacitor connected in parallel with each other is AC power, and is supplied into the full-bridge inverter circuit; however, because the full-bridge inverter circuit operates as a diode bridge, the AC power having been received is converted into DC power, and is supplied to the bidirectional buck-boost converter. The bidirectional buck-boost converter steps down the electric power having been received to a DC voltage of an appropriate magnitude. and supplies it to a load. In a case of charging electric power, the load can be made as a DC power source which is a secondary battery (for example, refer to Japanese Laid-Open Patent Publication No. 2012-244635).

RELATED ART DOCUMENT

Patent Document

[Patent Document 1] Japanese Laid-Open Patent Publication No. 2012-244635

SUMMARY OF THE INVENTION

Problems to be Solved by the Invention

A conventional non-contact power supply device includes a coil, an inverter circuit and a bidirectional buck-boost converter, and takes a configuration in which capacitors each can be connected to the coil selectively in series or parallel therewith by way of switches, so that electric power having been received is stepped down by the bidirectional buck-boost converter and is supplied to a load, by connecting a coil and a capacitor in series with each other on the side operating as an electric power transmission device, and by connecting another coil and another capacitor in parallel with each other on the side operating as an electric power reception device; and thus, a bidirectional non-contact power supply is implemented with a good electric power transmission efficiency.

However, in a method in which connection methods of a coil and capacitors are changed over by switches, the number of components increases, so that there arises not only a problem in making the device small-sized, but also a problem in life-spans of the switches and their reliability. In addition, although the bidirectional buck-boost converter is useful in a point in which electric power having been received is stepped down and supplied to a load, there arises a problem in that, when the operation as an electric power transmission device is ensued, a voltage value of a DC power source is only supplied substantially as it is to the inverter circuit, which is not actively useful for a highly efficient non-contact power supply. To be specific, if the operation is substantially performed only as a step-down or buck converter at a time of electric power reception, a lower-stage semiconductor switching device of the bidirectional buck-boost converter is wasting, there arises a problem in that optimization has not been accomplished in the configuration as a circuit.

The present invention has been directed at solving these problems described above, and an object of the invention is to obtain a bidirectional non-contact power supply device having a high electric power transmission efficiency.

SUMMARY OF THE INVENTION

Means for Solving the Problems

In a bidirectional non-contact power supply device according to the present invention in which a self coil being coupled with an other coil through a magnetic field coupling therebetween for performing electric power transmission to the other coil or performing electric power reception from the other coil, and a capacitor being connected in series with the self coil are connected to a first input-output end of an inverter circuit; a first input-output end of a bidirectional buck-boost converter is connected to a second input-output end of the inverter circuit; and a DC power source is connected to a second input-output end of the bidirectional buck-boost converter, the bidirectional non-contact power supply device is a device in which the bidirectional buck-boost converter converts, at a time of electric power transmission, electric power supplied from the DC power source to a voltage of the DC power source or less whose voltage is inputted into the inverter circuit, and converts, at a time of electric power reception, electric power outputted from the inverter circuit to an output voltage of the inverter circuit or more whose output voltage is supplied to the DC power source.

Effects of the Invention

According to the bidirectional non-contact power supply device of the present invention, it becomes possible to obtain a bidirectional non-contact power supply device having a high electric power transmission efficiency.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
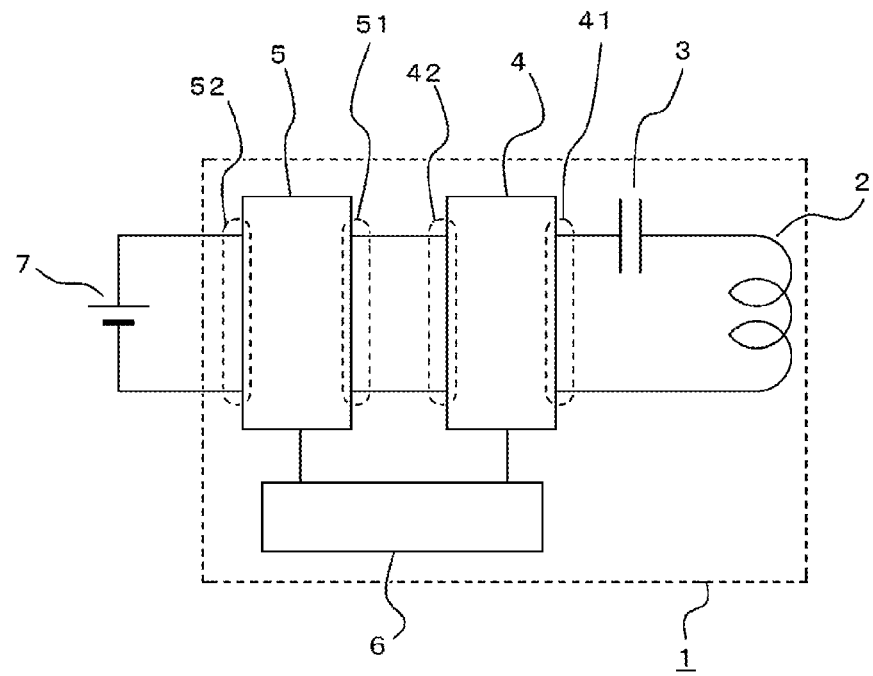
FIG. 1 is a circuit diagram illustrating a bidirectional non-contact power supply device according to Embodiment 1 of the present invention.

Hereinafter, the embodiments of the present invention will be described in detail referring to the drawings. Note that, in each of the figures, the same reference numerals and symbols designate the same items as, or the items corresponding to, those shown in the drawings.

Embodiment 1

FIG. 1 is a circuit diagram illustrating a two-way or bidirectional non-contact power supply device according to Embodiment 1 of the present invention. The bidirectional non-contact power supply device 1 includes a self coil (also referred to as an "own side coil") 2 magnetically coupled to another coil (also referred to as an "opposing side coil") for performing the transmission and reception of electric power, a capacitor 3 connected in series with the coil 2, an inverter circuit 4, a two-way or bidirectional buck-boost converter 5, and a control circuit 6 for controlling the inverter circuit 4 and the bidirectional buck-boost converter 5.

The inverter circuit 4 includes a first input-output end 41 and a second input-output end 42. Through the first input-output end 41, AC power is inputted and outputted, and, through the second input-output end 42, DC power is inputted and outputted. When the bidirectional non-contact power supply device 1 operates as an electric power transmission device, DC power is inputted through the second input-output end 42, and AC power is outputted from the first input-output end 41. Meanwhile, when the bidirectional non-contact power supply device 1 operates as an electric power reception device, AC power is inputted through the first input-output end 41, and DC power is outputted from the second input-output end 42.

The bidirectional buck-boost converter 5 includes a first input-output end 51 and a second input-output end 52. Through both of the first input-output end 51 and the second input-output end 52, DC power is inputted and outputted. A voltage on the first input-output end 51 is a voltage of the second input-output end 52 or less. Namely, the bidirectional buck-boost converter 5 operates, at the time of operating as an electric power transmission device, as a buck converter in which a DC voltage inputted on the second input-output end 52 is stepped down or maintained at the magnitude of voltage as it is, and is outputted from the first input-output end 51; and the bidirectional buck-boost converter operates, at the time of operating as an electric power reception device, as a step-up or boost converter in which a DC voltage inputted on the first input-output end 51 is stepped up or maintained at the magnitude as it is, and is outputted from the second input-output end 52. To the second input-output end 52 of the bidirectional buck-boost converter 5, a DC power source 7 is connected which is not a constituent element of the bidirectional non-contact power supply device 1 of the embodiment. When the bidirectional non-contact power supply device 1 operates as an electric power transmission device, DC power is inputted from the DC power source 7, whereas operating as an electric power reception device, DC power is outputted into the DC power source 7.

To the first input-output end 41 of the inverter circuit 4, the coil 2 and the capacitor 3 connected in series with each other are connected; and, to the second input-output end 42, the first input-output end 51 of the bidirectional buck-boost converter 5 is connected. Namely, a voltage of the second input-output end 42 of the inverter circuit 4 is equated in the magnitude of voltage with a voltage of the first input-output end 51 of the bidirectional buck-boost converter 5.

Figure 2:
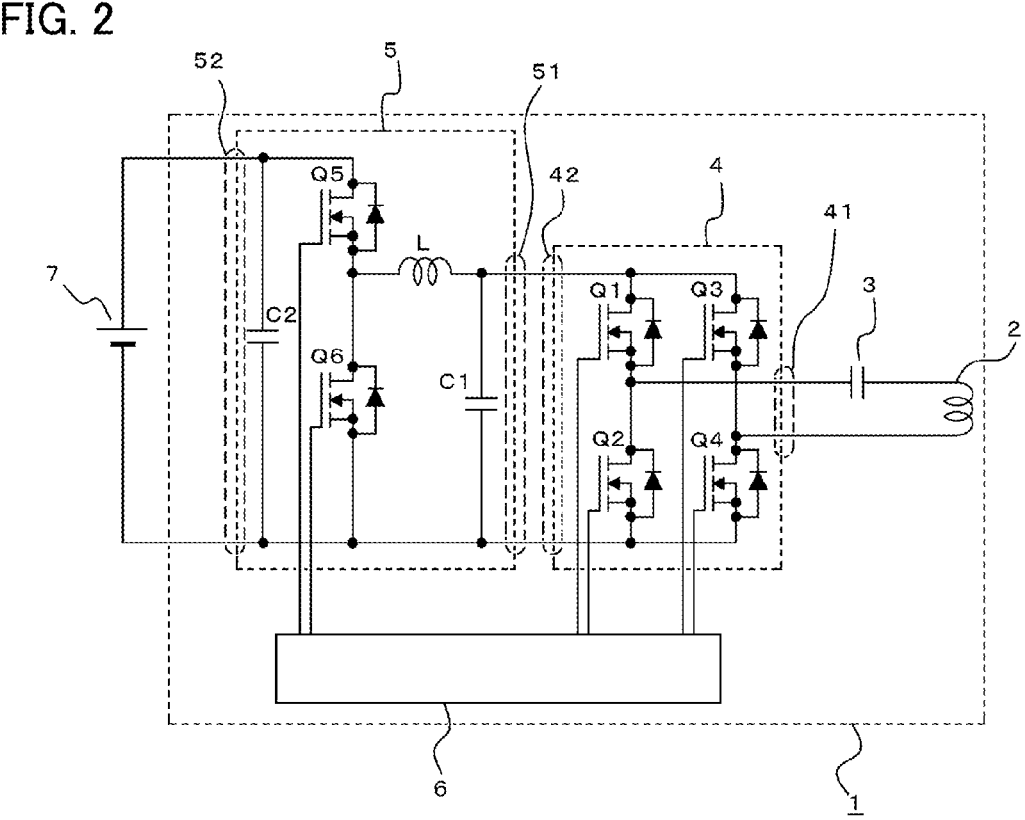
FIG. 2 is a circuit diagram illustrating a specific configuration of the bidirectional non-contact power supply device according to Embodiment 1 of the present invention.

FIG. 2 is a circuit diagram more specifically illustrating a configuration of the bidirectional non-contact power supply device 1 illustrated in FIG. 1. Note that, the circuit illustrated here has been shown by way of example; it is needless to say that a circuit which performs similar operations is the same as the bidirectional non-contact power supply device illustrated in FIG. 1.

The inverter circuit 4 is made of a bridge circuit in which semiconductor switching devices Q1, Q2, Q3 and Q4 of MOSFETs, IGBTs and the like are formed in full-bridge connection. Namely, a pair of the semiconductor switching devices Q1 and Q2 connected in series, and a pair of those Q3 and Q4 connected in series are connected in parallel with each other to make the configuration. And then, the midpoint of the semiconductor switching devices Q1 and Q2, and the midpoint of those Q3 and Q4 are both connected on the first input-output end 41 of the inverter circuit 4; a connection point of the semiconductor switching devices Q1 and Q3, and a connection point of the semiconductor switching devices Q2 and Q4 are both connected on the second input-output end 42 of the inverter circuit 4.

When the semiconductor switching devices are of MOSFETs, the MOSFETs are built in with respective feedback diodes as shown in FIG. 2. When the semiconductor switching devices are of IGBTs, there are also devices which are built in with feedback diodes as in FIG. 2; however, there also exist devices which are not built in with feedback diodes. When IGBTs in which feedback diodes each are not built in are used, respective diodes are provided for the semiconductor switching devices Q1, Q2, Q3 and Q4 of the IGBTs in parallel with each other by the scheme shown in FIG. 2.

According to the configuration described above, the inverter circuit 4 converts DC power inputted through the second input-output end 42 into AC power by performing the control on turn-on and turn-off of the semiconductor switching devices Q1, Q2, Q3 and Q4 by means of a signal(s) from the control circuit 6, and outputs the AC power from the first input-output end 41. In addition, AC power inputted from the first input-output end 41 is full-wave rectified by means of a diode bridge configured by the feedback diodes of the semiconductor switching devices Q1, Q2, Q3 and Q4, and is converted into DC power, which is outputted from the second input-output end 42. When the semiconductor switching devices are made of MOSFETs, a synchronous rectification may be performed at timings where an electric current passes through feedback diodes by turning on MOSFETs correspondingly with respect to the feedback diodes.

The bidirectional buck-boost converter 5 is configured by connecting a reactor L in the midpoint of semiconductor switching devices Q5 and Q6 of MOSFETs, IGBTs and the like connected in series with each other. As shown in FIG. 2, the other end of the reactor L is connected on the first input-output end 51, and a capacitor C1 is connected on the first input-output end 51. Meanwhile, a leg of the semiconductor switching devices Q5 and Q6 connected in series is connected on the second input-output end 52, and a capacitor C2 is connected across on the second input-output end 52. When the semiconductor switching devices Q5 and Q6 are of IGBTs in which feedback diodes each are not built in, respective diodes are provided for the semiconductor switching devices Q5 and Q6 of the IGBTs in parallel with each other in the directions shown in FIG. 2. Turn-on and turn-off of the semiconductor switching devices Q5 and Q6 are controlled by the control circuit 6.

When the bidirectional non-contact power supply device 1 operates as an electric power transmission device, the bidirectional buck-boost converter 5 operates as a buck converter, and so the semiconductor switching device Q5 is turn-on/turn-off controlled by means of signals from the control circuit 6 at a duty ratio (the ratio of turn-on time with respect to a total sum of turn-on time and turn-off time) in accordance with a buck voltage ratio (the ratio between the magnitude of a voltage inputted on the second input-output end 52 and the magnitude of a voltage outputted from the first input-output end 51). At this time, the semiconductor switching device Q6 may be turned off at all times; however, when the semiconductor switching device Q6 is made of a MOSFET, a synchronous rectification may be performed at timings where an electric current passes through feedback diodes by turning on the semiconductor switching device Q6 by means of signals from the control circuit 6. Meanwhile, when the bidirectional non-contact power supply device 1 operates as an electric power reception device, the bidirectional buck-boost converter 5 operates as a boost converter, and so the semiconductor switching device Q6 is turn-on/turn-off controlled by means of signals from the control circuit 6 at a duty ratio in accordance with a boost voltage ratio (the ratio between the magnitude of a voltage inputted on the first input-output end 51 and the magnitude of a voltage outputted from the second input-output end 52). At this time, the semiconductor switching device Q5 may be turned off at all times; however, when the semiconductor switching device Q5 is made of a MOSFET, a synchronous rectification may be performed at timings where an electric current passes through feedback diodes by turning on the semiconductor switching device Q5 by means of signals from the control circuit 6.

The bidirectional non-contact power supply device 1 of the embodiment is constituted and operated as described above.

Figure 3:
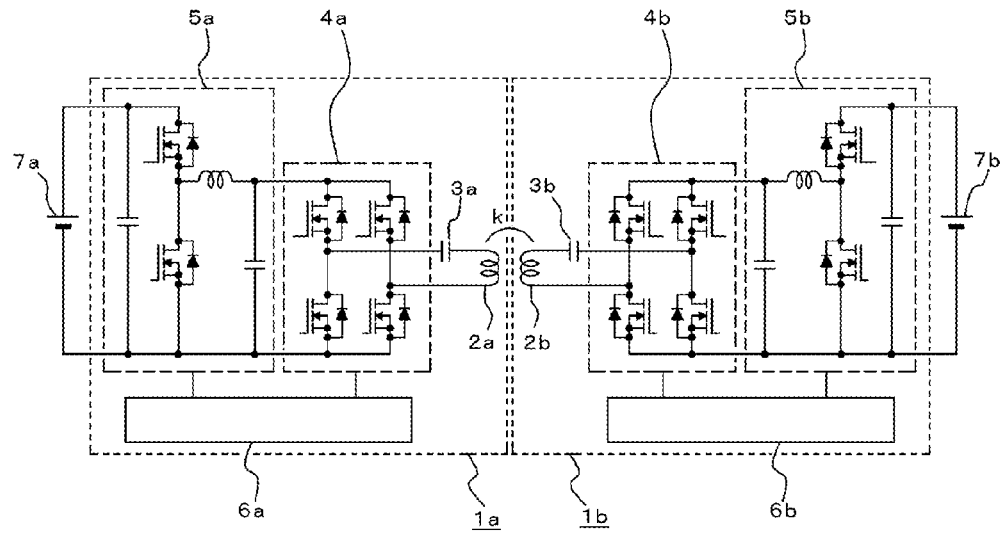
FIG. 3 is a circuit diagram illustrating a bidirectional non-contact power supply system according to bidirectional non-contact power supply devices in Embodiment 1 of the present invention.
Figure 4:
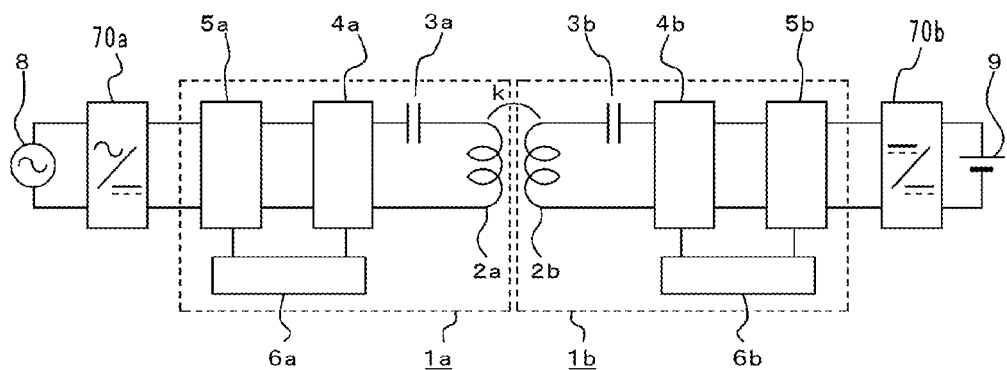
FIG. 4 is a circuit diagram illustrating another bidirectional non-contact power supply system according to the bidirectional non-contact power supply devices in Embodiment 1 of the present invention.

FIG. 3 is a circuit diagram illustrating a bidirectional non-contact power supply system using two of the bidirectional non-contact power supply devices of the embodiment. In addition, FIG. 4 is a circuit diagram illustrating another bidirectional non-contact power supply system using two of the bidirectional non-contact power supply devices. The bidirectional non-contact power supply systems of FIG. 3 and FIG. 4 each are constituted of a first bidirectional non-contact power supply device 1a and a second bidirectional non-contact power supply device 1b. A coil 2a of the first bidirectional non-contact power supply device 1a and a coil 2b of the second bidirectional non-contact power supply device 1b are magnetically coupled to each other with a coupling coefficient k. It is so arranged that the first bidirectional non-contact power supply device 1a and the second bidirectional non-contact power supply device 1b have identical circuit configurations, and take the configurations symmetrical with respect to the right and left in the drawing. In addition, inverter circuits 4a and 4b and bidirectional buck-boost converters 5a and 5b are constituted of the semiconductor switching devices Q1 through Q6 or the like similarly to the inverter circuit 4 and the bidirectional buck-boost converter 5 shown in FIG. 2, respectively.

In the bidirectional non-contact power supply system of FIG. 3, a DC power source 7a is connected on a second input-output end of the bidirectional buck-boost converter 5a of the first bidirectional non-contact power supply device 1a, and a DC power source 7b is connected on a second input-output end of the bidirectional buck-boost converter 5b of the second bidirectional non-contact power supply device 1b. As for the DC power sources 7a and 7b each, a DC power source capable of charging and discharging electric power such as a lithium ion battery may be suitable, for example. To the inverter circuit 4a, the coil 2a and a capacitor 3a connected in series with each other are connected; and to the inverter circuit 4b, the coil 2b and a capacitor 3b connected in series with each other are connected.

Meanwhile, in the bidirectional non-contact power supply system of FIG. 4, a bidirectional AC/DC converter 70a is connected in place of the DC power source 7a of FIG. 3, and an AC power source 8 is connected on another end of the bidirectional AC/DC converter 70a. The bidirectional AC/DC converter is an electric power converter in which AC power inputted from first terminals is converted into DC power, and it is outputted to second terminals, whereas DC power inputted from the second terminals is converted into AC power, and it is outputted to the first terminals. That is to say, because input and output of DC power can be performed through the second terminals of the bidirectional AC/DC converter 70a, the bidirectional AC/DC converter is the same as a DC power source from a viewpoint of the first bidirectional non-contact power supply device 1a; and therefore, a device such as the bidirectional AC/DC converter 70a of FIG. 4 for inputting or outputting DC power is also included for the DC power source named in the present invention.

In addition, in the bidirectional non-contact power supply system of FIG. 4, a bidirectional DC/DC converter 70b is connected in place of the DC power source 7b of FIG. 3, and a DC power source 9 capable of charging and discharging electric power such as a lithium ion battery is connected on another end of the bidirectional DC/DC converter 70b. The bidirectional DC/DC converter 70b of FIG. 4 is an electric power converter in which DC power inputted from its first terminals is stepped down or stepped up in voltage so that a value of the voltage is changed and is outputted to its second terminals, whereas DC power inputted from the second terminals is stepped down or stepped up in voltage so that a value of the voltage is changed and is outputted to the first terminals. That is to say a DC/DC conversion device. As for charging and discharging electric power of a lithium ion battery, there may be a case in which a dedicated charge-discharge device is provided; however, in such a case, a charge-discharge device, namely, a device such as the bidirectional DC/DC converter 70b of FIG. 4 for inputting or outputting DC power is also included for the DC power source named in the present invention.

Because the first bidirectional non-contact power supply device 1a and the second bidirectional non-contact power supply device 1b are devices separately provided for each other, a respective apparatus mounting each of the devices thereon can be independently used. Because a coupling coefficient k between the coil 2a and the coil 2b changes depending on a mutual placement relationship of the coils, the coupling coefficient changes depending on a state when each of the bidirectional non-contact power supply devices is placed in order to perform a bidirectional non-contact power supply. The coupling coefficient k is a coefficient taking on values 0 to 1, and, in order to achieve a high electric power transmission efficiency, it is desirable to place each of the bidirectional non-contact power supply devices so that their coupling coefficient k takes on the largest; however, there also arise inconvenient cases in which precisely achieving alignment gives rise to stress caused on a user and the like, so that, in general, the coupling coefficient k becomes smaller than the maximum coefficient. A state in such a coupling coefficient k that is smaller than the maximum coefficient is referred to as "positional displacement." This means that positions of the coils 2a and 2b are misaligned from their ideal positions.

Next, the explanation will be made for the operations of the bidirectional non-contact power supply system of FIG. 3. The explanation will be made for a case in which the first bidirectional non-contact power supply device 1a operates as an electric power transmission device, and the second bidirectional non-contact power supply device 1b operates as an electric power reception device. Note that, because the bidirectional non-contact power supply devices 1a and 1b have identical circuit configurations as described above, an electric power supply in a reverse direction with respect to the aforementioned explanation can be performed by operating the first bidirectional non-contact power supply device 1a as an electric power reception device and the second bidirectional non-contact power supply device 1b as an electric power transmission device, so that electric power supplies can be achieved in both directions; and so, their detailed explanation will be omitted for a case in which the first bidirectional non-contact power supply device 1a operates as an electric power reception device, and the second bidirectional non-contact power supply device 1b, as an electric power transmission device.

When the coil 2a of the bidirectional non-contact power supply device 1a and the coil 2b of the bidirectional non-contact power supply device 1b are magnetically coupled to each other at a coupling coefficient k and are placed in a state capable of supplying electric power, which is verified by means of radio communications that the electric power transmission and reception is mutually put in the state capable of carrying out. Given that, the inverter circuit 4a of the bidirectional non-contact power supply device 1a being an electric power transmission device starts the switching at a predetermined switching frequency, for example at 85 kHz or the like, and DC power inputted on the second input-output end of the inverter circuit 4a is converted into AC power, which is outputted from the first input-output end of the inverter circuit 4a. In the bidirectional buck-boost converter 5a on the power transmission side, the DC power source 7a is connected to the second input-output end; however, it is so arranged that, at a time when electric power transmission starts, both of upper-stage and lower-stage semiconductor switching devices are turned off, so that an output voltage from the first input-output end is 0 V. And then, the upper-stage semiconductor switching device of the bidirectional buck-boost converter 5a starts the switching so that a DC voltage is outputted on the first input-output end of the bidirectional buck-boost converter 5a, and thus the DC voltage is inputted on the second input-output end of the inverter circuit 4a.

Because the bidirectional buck-boost converter 5a operates as a buck converter at the time of electric power transmission, the lower-stage semiconductor switching device is held turned off; however, it is better to perform a soft start in which a duty ratio (the ratio of turn-on time with respect to a total sum of turn-on time and turn-off time) of the upper-stage semiconductor switching device is gradually made larger from "0" at a time when electric power transmission starts. At this time, in order not to make an electric current outputted to the coil 2a from the first input-output end of the inverter circuit 4a become excessively large, it is suitable to arrange that an upper-limit value is set while detecting the electric current, and that, when the upper-limit value is to be exceeded, standby is implemented not to make larger a duty ratio of the upper-stage semiconductor switching device of the bidirectional buck-boost converter 5a so that a voltage outputted from the first input-output end of the bidirectional buck-boost converter 5a being a buck converter does not increase.

Because a duty ratio of the inverter circuit 4a can also be controlled by means of signals from a control circuit 6a, it may be adopted that the duty ratio is controlled in accordance with the conditions; however, because switching losses in the semiconductor switching devices of the inverter circuit 4a increase, if the duty ratio is to be made small, so that it is best to set the duty ratio of the inverter circuit 4a at the maximum, namely, 50%.

And then, the bidirectional buck-boost converter 5a performs a feedback control on a duty ratio of the upper-stage semiconductor switching device of the bidirectional buck-boost converter 5a so that electric power measured on the second input-output end, namely, the electric input power becomes constant in accordance with an instruction value of transmission power. Note that, the instruction value of transmission power is a value of transmission power instructed from the outside to the bidirectional non-contact power supply device 1a being an electric power transmission device; the outside stated here may be request made from the bidirectional non-contact power supply device 1b being an electric power reception device and/or an instruction value made from a user. Namely, the bidirectional non-contact power supply device 1a being an electric power transmission device recognizes a value of electric power which should be transmitted, and the control is performed so that electric power inputted into the bidirectional buck-boost converter 5a becomes constant at the value of electric power which should be transmitted.

Meanwhile, in the bidirectional non-contact power supply device 1b being an electric power reception device, the coil 2b is magnetically coupled to the coil 2a at a coupling coefficient k, so that an alternating current flows through the coil 2b. The frequency of the alternating current is made identical to that of a switching frequency of the inverter circuit 4a on the side of an electric power transmission device. Because of the alternating current which flows through the coil 2b, AC power is supplied into the bidirectional non-contact power supply device 1b being an electric power reception device without making contact therewith. Because the bidirectional non-contact power supply device 1b is an electric power reception device, the semiconductor switching devices of the inverter circuit 4b are all turned off, so that the inverter circuit 4b operates as a diode bridge. Therefore, AC power received by the coil 2b is converted by the inverter circuit 4b into DC power, which is outputted from the second input-output end of the inverter circuit 4b and supplied into the bidirectional buck-boost converter 5b.

When the operation as an electric power reception device is ensued, the bidirectional buck-boost converter 5b operates as a boost converter, so that the upper-stage semiconductor switching device of the bidirectional buck-boost converter 5b is held turned off. Meanwhile, the lower-stage semiconductor switching device is turned on (with its duty ratio at 100%) at the time of starting an electric power supply, and is controlled so that the duty ratio is gradually made smaller. It is known that a non-contact power supply system in which its coils and capacitors are connected in series to each other as pairs on both of a power transmission side and a power reception side has characteristics of an immittance converter. The immittance converter means the characteristics in which its output current becomes constant when its input voltage is constant, and its output voltage becomes constant when its input current is constant.

This shows that the power supply system described in the embodiment also has the characteristics of an immittance converter, and so, when impedance viewed from an electric power reception coil downstream thereof is "Z," the impedance viewed from the inverter circuit on the power transmission side is inversely proportional to the "Z." That is, by turning on the lower-stage semiconductor switching device (with its duty ratio at 100%) of the bidirectional buck-boost converter 5b at a time when an electric power supply starts, the impedance "Z" viewed from the coil 2b downstream thereof on the power reception side becomes significantly small, and the impedance viewed from the inverter circuit 4a on the power transmission side becomes significantly large, because the impedance viewed therefrom is inversely proportional to the "Z." As a result, even when a DC voltage is suddenly inputted into the inverter circuit 4a on the power transmission side, a large electric current is curbed from flowing in, so that the electric power supply can be safely started.

And then, by gradually making smaller a duty ratio of the lower-stage semiconductor switching device in the bidirectional buck-boost converter 5b on the power reception side, the impedance "Z" viewed from the coil 2b downstream thereof on the power reception side is gradually made larger, so that electric power being inputted is gradually increased, because the impedance viewed from the inverter circuit 4a on the power transmission side is gradually made smaller. According to the above, a soft start of non-contact power supply is performed. And at a time when transmission power reaches an instruction value of transmission power, the duty ratio of the lower-stage semiconductor switching device of the bidirectional buck-boost converter 5b is controlled so that the electric power on the second input-output end of the bidirectional buck-boost converter 5b, namely, the electric power outputted from the bidirectional buck-boost converter 5b is maximized. As for a control method at this time, a hill-climbing method can be used. By performing such control on the power transmission side and on the power reception side, the bidirectional non-contact power supply system can entirely perform the electric power supply under a condition in which the efficiency becomes highest, so that the system can be automatically operated under the condition in that the efficiency becomes highest.

Figure 5:
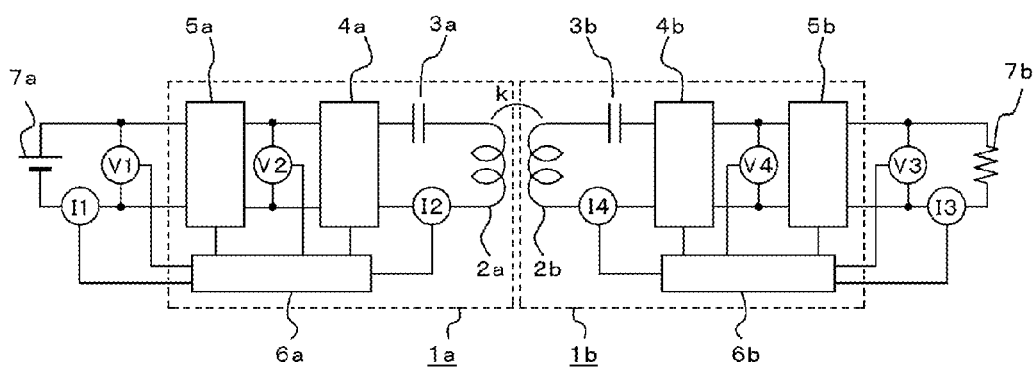
FIG. 5 is a circuit diagram illustrating a bidirectional non-contact power supply system at the time of a G2V electric power supply according to the bidirectional non-contact power supply devices in Embodiment 1 of the present invention.

Next, the explanation will be made referring to experimental results according to an engineering model of a bidirectional non-contact power supply system. FIG. 5 is a circuit diagram illustrating the bidirectional non-contact power supply system having been used for the experiments. The bidirectional non-contact power supply system of FIG. 5 is the same as the bidirectional non-contact power supply system of FIG. 3; however, in the experiments, a resistor (electronic load device) 71b having had equivalent resistance as the same as the DC power source 7b was used in place of the DC power source 7b that was a lithium ion battery on the power reception side. Therefore, in FIG. 5, when the power transmission side and the power reception side were substituted with each other, the experiments were performed by also substituting the DC power source 7a on the power transmission side with the resistor 71b on the power reception side.

The bidirectional non-contact power supply device of the embodiment is a device in which a DC power source is connected on the second input-output end of the bidirectional buck-boost converter; however, the wording "being connected" named here means "capable of being connected," but does not mean "always being connected." That is, as the experiments demonstrate here, the bidirectional non-contact power supply device is the device of the present invention even in a case in which the DC power source 7a being an electric power supply source is substituted with the resistor 71b being a load, when the power transmission side and the power reception side are substituted with each other. Namely, the bidirectional non-contact power supply device serves as an electric power transmission device, and also serves as an electric power reception device; however, at the time of serving as an electric power transmission device, the bidirectional non-contact power supply device does not function in the first place as an electric power transmission device if a DC power source being an electric power supply source was not included, and so a bidirectional non-contact power supply device in which a DC power source is not connected on the second input-output end of the bidirectional buck-boost converter under any circumstances is not included in the bidirectional non-contact power supply device of the present invention.

In addition, in FIG. 5, the symbols shown by V1 through V4 designate voltage detection means such as voltage sensors, and the symbols shown by I1 through I4 designate electric current detection means such as electric current sensors. Voltage values and electric current values detected by the voltage sensors and the electric current sensors are inputted into the control circuits 6a and 6b, and are utilized for the control of the bidirectional non-contact power supply devices 1a and 1b. In the explanation above, it is described that an electric power transmission device controls electric power inputted into the bidirectional buck-boost converter 5a at constant; this stands for that the electric power acquired by calculating V1 of the voltage sensor and I1 of the electric current sensor in FIG. 5 is controlled at constant. Similarly, it is described that an electric power reception device is controlled by means of a hill-climbing method so that electric power outputted from the bidirectional buck-boost converter 5b is maximized; this stands for that the control is performed by the hill-climbing method so that the electric power acquired by calculating V3 of the voltage sensor and I3 of the electric current sensor in FIG. 5 is maximized. Moreover, an electric current outputted from the inverter circuit 4a and flowed through the coil 2a is detected by the electric current sensor I2, and the control is performed by means of the control circuit 6a so that the electric current outputted from the inverter circuit 4a does not become excessively large. As for voltages at the connecting portions between the inverter circuits and the bidirectional buck-boost converters, namely, the voltage values detected by the voltage sensors V2 and 4 are not used in the explanation stated above; however, they are described because of the necessity to explain the experimental results.

The experiments were performed by assuming that, in a system in which a voltage of the DC power source 7a on one side was constant at 219 V and a lithium ion battery was used as the DC power source 7b on the other side where a voltage of the DC power source 7b varied from 139 to 214 V, the system performed electric power supplies in both directions at a maximum of 1 kW. These were the experiments which assumed a bidirectional non-contact power supply between an electric automotive vehicle and a power conditioner connected to an electric power-system's power-source (commercial AC power source); however, an electric power supply at a maximum of 3 kW was presumed in an actual system. The experiments were for pursuing a principle verification, so that the power supply was set at the maximum of 1 kW. Note that, in actual experiments, a DC power-source device was used in place of the power conditioner, and the resistor (electronic load device) 71b, in place of the lithium ion battery. The engineering model of the maximum of 1 kW used in the experiments was a system which had been designed so that an equivalent resistance of an actual system of 3 kW and that of a load were the same.

In the following explanation, the wordings of a "G2V power supply" and a "V2G power supply" are appropriately used in order to indicate directions of an electric power supply. The "G2V power supply" corresponds to an electric power supply from a DC power source whose voltage is constant at 219 V into a lithium ion battery whose voltage varies from 139 to 214 V; because the electric power supply is originated from an electric power-system's power-source (Grid) toward an electric automotive vehicle (Vehicle), the power supply is referred to as a "Grid to Vehicle," and stated as a "G2V" for brevity. In FIG. 5, the electric power supply corresponds to that from left to right in the drawing. On the other hand, the "V2G power supply" corresponds to an electric power supply from a lithium ion battery whose voltage varies from 139 V to 214 V into a DC power source whose voltage is constant at 219 V; because the electric power supply is originated from an electric automotive vehicle (Vehicle) toward an electric power-system's power-source (Grid), the power supply is referred to as a "Vehicle to Grid," and stated as a "V2G" for brevity. In FIG. 5, the electric power supply corresponds to that from right to left in the drawing. However, in the "V2G power supply" as described above, the DC power source 7a of FIG. 5 and the resistor 71b thereof are substituted with each other, so that the DC power source 7a is assigned on the side of the resistor 71b (placed on the right-hand side), and the resistor 71b is assigned on the side of the DC power source 7a (placed on the left-hand side).

In the "G2V power supply," because an equivalent resistance of the battery was from 19.3 to 45.8Ω when charging was performed at electric power of 1 kW into a lithium ion battery whose voltage varied from 139 to 214 V, the resistance of the resistor (electronic load device) 71b was varied from below and above the range of 19.3 to 45.8Ω when the resistor 71b emulated the lithium ion battery. On the other hand, at the time of a "V2G power supply" in the reverse direction, voltages of the lithium ion battery were presumed to be at the minimum of 139 V and the maximum of 214 V, and the experiments were performed for the two voltages; and it was presumed that the voltage on the power reception side was constant at 219 V.

Figure 6A:
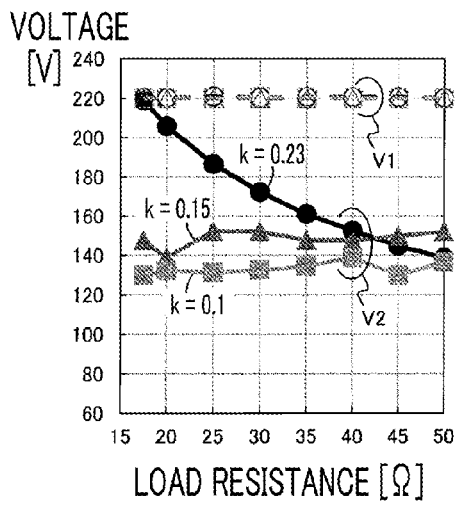
FIG. 6A and FIG. 6B are diagrams each showing experimental results of respective portions' voltages in a bidirectional non-contact power supply system at the time of a G2V electric power supply.
Figure 6B:
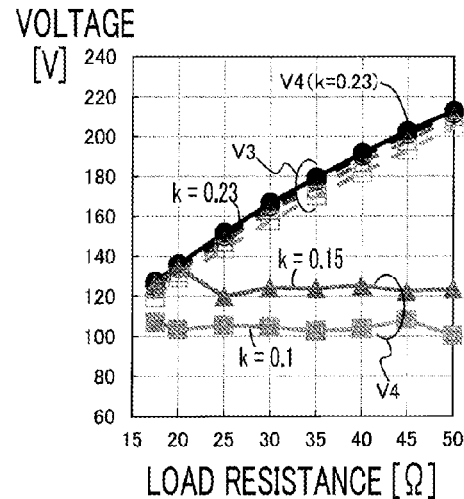

In addition, in the "V2G power supply" in the reverse direction, it was assumed that an apparatus was connected on the power reception side (Grid side, where the voltage is constant at 219 V), and that the power consumption required for the apparatus varied in a range of 0.167 to 1 kW, and thus the transmission power (Vehicle side) was varied. The engineering model is a system to perform the control as described above, duty ratios of both of the bidirectional buck-boost converters on the power transmission side and on the power reception side are under automatic control by means of the control circuits. FIG.) 6A and FIG. 6B are diagrams each showing experimental results of respective portions' voltages by VI to V4 of the voltage detection means (voltage sensors) described in FIG. 5. By presuming positional displacement of the coils, coupling coefficients k of the coil 2a and the coil 2b were varied in performance for three kinds of k=0.23, k=0.15 and k=0.1. FIG. 6A is diagram showing experimental results of voltages V1 on the second input-output end of the bidirectional buck-boost converter 5a on the power transmission side (Grid side) and voltages V2 on the first input-output end thereof; and FIG. 6B is diagram showing experimental results of voltages V4 on the first input-output end of the bidirectional buck-boost converter 5b on the power reception side (Vehicle side) and voltages V3 on the second input-output end thereof. The transmission power, namely, the electric input power of the bidirectional buck-boost converter 5a was constant at 1 kW.

As shown in FIG. 6A, because the voltage V1 is at a voltage of the DC power source 7a, the voltage V1 is constant at 219 V at all of the coupling coefficients k; however, it is so arranged that a voltage (output voltage) V2 of the bidirectional buck-boost converter 5a changes in accordance with the magnitude of load resistance at the coupling coefficient k=0.23, whereas voltages V2 are approximately constant without depending on the variation in the magnitude of load resistance at k=0.15 and k=0.1.However, it is so arranged that the magnitudes of voltage V2 differ between k=0.15 and k=0.1, and the voltage is higher at k=0.15. In any cases of k=0.1 to 0.23, however, the bidirectional buck-boost converter 5a on the power transmission side operates as a buck converter, so that the bidirectional buck-boost converter 5a converts the electric power supplied from the DC power source 7a to a voltage which is a voltage value of the DC power source 7a or less, and inputs the voltage into the inverter circuit 4a.

In FIG. 6B, a voltage V3 on, the second input-output end of the bidirectional buck-boost converter 5b, namely, the voltage V3 outputted to the resistor 71b changes to have an approximately constant relationship with respect to the magnitude of load resistance, although there exist the difference to a certain extent depending on the magnitudes of coupling coefficient k. This is because the transmission power is constant at 1 kW, and because the magnitude of load resistance has been determined, a terminal voltage of the load resistance is defined by the square root of a multiplication value of electric power and a resistance value. However, because the electric power is the power consumption of the load resistance, the electric power appears smaller than electric input power correspondingly by the amount of system losses; and thus, the smaller a coupling coefficient k is, the larger system losses become, so that the smaller the coupling coefficient k is, the lower the voltage V3 is also.

Meanwhile, it is so arranged that a voltage V4 on the first input-output end of the bidirectional buck-boost converter 5b is slightly higher than a voltage V3 on the second input-output end thereof at the coupling coefficient k=0.23, whereas voltages V4 are approximately constant without depending on the magnitude of load resistance, and are lower than voltages V3 on the second input-output end at the coupling coefficients k=0.15 and k=0.1.

When a bidirectional buck-boost converter serving as an electric power reception device operates as a boost converter; however, when k=0.23, the bidirectional buck-boost converter 5b does not perform switching operation, so that DC power being inputted on the first input-output end of the bidirectional buck-boost converter 5b is outputted as it is on the second input-output end. Because, at this time, the feedback diode of the upper-stage semiconductor switching device of the bidirectional buck-boost converter 5b is passed through, the voltage is reduced correspondingly by the amount of a forward voltage of the feedback diode. Namely, the difference between the voltages V3 and V4 when k=0.23 is caused by a voltage drop due to a forward voltage of the feedback diode. However, the forward voltage of a diode is significantly small from a viewpoint of voltages in the system as a whole, and so, because the bidirectional buck-boost converter 5b does not perform switching operation, it has no difficulty in determining that a voltage inputted into the bidirectional buck-boost converter 5b and a voltage outputted therefrom are substantially at the same voltage values. This can be similarly mentioned that a voltage drop or the like due to electrical resistance of wiring or the like can also be ignored. That is to say, when it is stated that a bidirectional buck-boost converter converts a voltage being inputted to a voltage which is the voltage being inputted or a voltage of more than it and that the bidirectional buck-boost converter outputs it, the bidirectional buck-boost converter does not perform switching operation in a strict sense, and an output voltage of the bidirectional buck-boost converter is slightly lower than its input voltage because of voltage drops due to a forward voltage of the diode and electrical resistance of wiring; even in this case, it should be interpreted that such a case is included in a "voltage or more" in the embodiment. Namely, at all of the coupling coefficients k according to the experimental result of FIG. 6B, the bidirectional buck-boost converter 5b on the power reception side converts electric power outputted from the inverter circuit 4b to a voltage which is an output voltage of the inverter circuit 4b or more, and supplies it to the resistor (electronic load device) 71b corresponding to a lithium ion battery being a DC power source.

Figure 7:
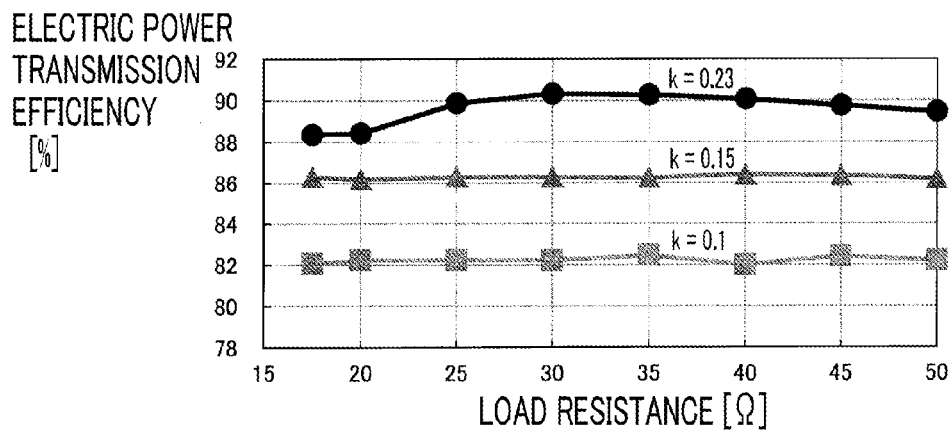
FIG. 7 is a diagram showing experimental results of electric power transmission efficiencies in the bidirectional non-contact power supply system at the time of a G2V electric power supply.

FIG. 7 is a diagram showing experimental results of electric power transmission efficiencies experimentally based on the experimental results shown in FIG. 6A and FIG. 6B. The electric power transmission efficiency is an efficiency which is calculated from the ratio between electric output power of the DC power source 7a in FIG. 5, and power consumption of the resistor 71b. In a range of all the load resistance, the efficiency of 82% or more is obtained at k =0.1, 86% or more, at k =0.15, and 88% or more, at k 0.23; and, from 30 to 40 Ω, 90% or more is obtained at k =0.23. By using the bidirectional non-contact power supply devices of the embodiment as the experimental results of FIG. 7 show, a bidirectional non-contact power supply system can be obtained in which its electric power transmission efficiency is high.

Figure 8:
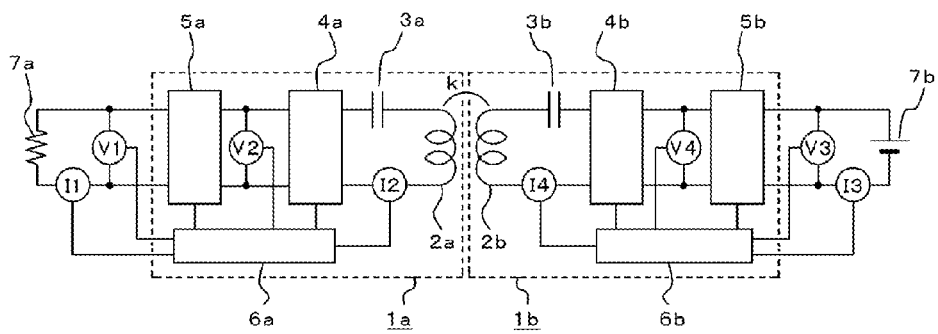
FIG. 8 is a circuit diagram illustrating a bidirectional non-contact power supply system at the time of a V2G electric power supply according to Embodiment 1 of the present invention.

Next, experimental results will be described for a case of a V2G electric power supply which is an electric power supply performed in a reverse direction. FIG. 8 is a circuit diagram illustrating a bidirectional non-contact power supply system when an electric power supply is performed in a reverse direction. The circuit diagram of FIG. 8 is a diagram in which the DC power source and the resistor in the circuit diagram of FIG. 5 are substituted with each other, and so other items and components take the same as those in FIG. 5. In FIG. 8, an electric power supply is performed from the DC power source 7b corresponding to a lithium ion battery whose output voltage varies from 139 V to 214 V to a resistor 71a corresponding to a power conditioner whose input voltage is constant at 219 V. As for voltage values of the DC power source 7b, the experiments were performed according to two kinds, at the maximum value of 214 V and the minimum value of 139 V; and it was presumed that the power consumption of the resistor 71a varied in a range of 0.167 kW to 1 kW. In the V2G electric power supply of FIG. 8, the second bidirectional non-contact power supply device 1b operates as an electric power transmission device, and the first bidirectional non-contact power supply device operates as an electric power reception device.

FIG. 9A, FIG. 9B, FIG. 9C and FIG. 9D are diagrams each showing experimental results when voltages of the DC power source 7b are at 214 V and 139V. The experimental results show respective portions' voltages having been obtained, similarly to the G2V electric power supply described above, when the control circuits 6a and 6b controlled the switching of the bidirectional buck-boost converters 5a and 5b under automatic control so that electric power transmission efficiencies were maximized in each of conditions.

Figure 9A:
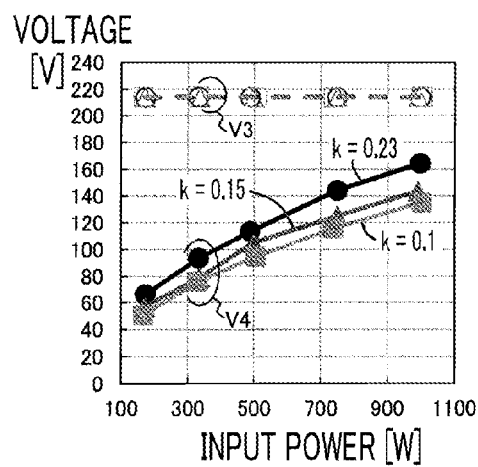
FIG. 9A, FIG. 9B, FIG. 9C and FIG. 9D are diagrams each showing experimental results of respective portions' voltages in a bidirectional non-contact power supply system at the time of a V2G electric power supply.
Figure 9B:
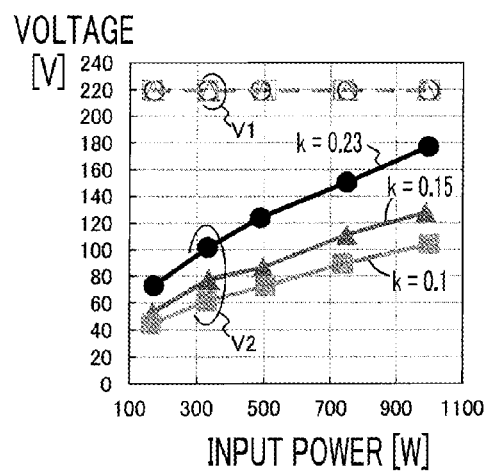
Figure 9C:
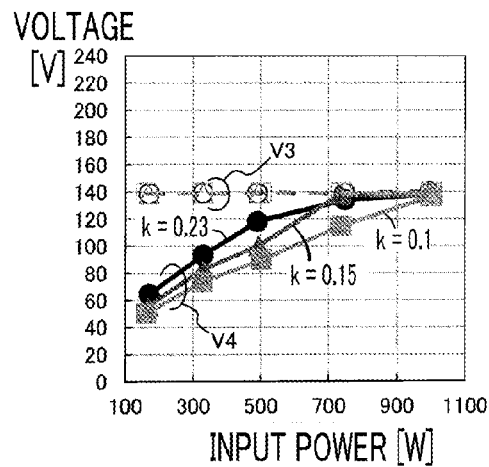

FIG. 9A is the diagram that shows voltages V3 on the second input-output end of the second bidirectional buck-boost converter 5b being an electric power transmission device, and voltages V4 on the first input-output end thereof, when the voltage of the DC power source 7b is at 214 V; and FIG. 9B is the diagram that shows voltages V2 on the first input-output end of the first bidirectional buck-boost converter 5a being an electric power reception device, and voltages V1 on the second input-output end thereof. FIG. 9C is the diagram that similarly shows the voltages V3 and V4, when the voltage of the DC power source 7b is at 139 V; and FIG. 9D, similarly shows the voltages V2 and V1, when the voltage of the DC power source 7b is at 139 V.

Figure 9D:
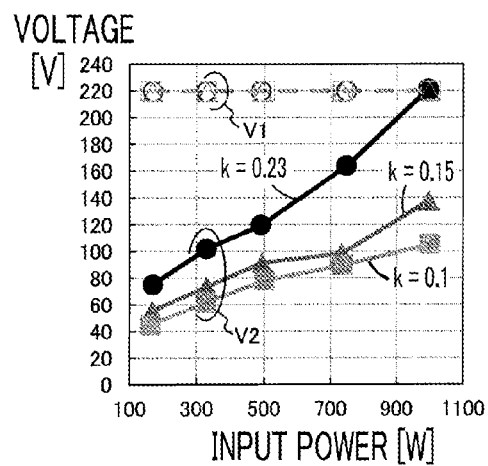

FIG. 9A and FIG. 9C are the diagrams that show the voltage (input voltage) V3 and voltage (output voltage)V4 of the bidirectional buck-boost converter 5b on the power transmission side; as it can be understood from the diagrams that the bidirectional buck-boost converter 5b on the power transmission side converts electric power supplied from the DC power source 7b to the voltage V4 which is the voltage V3 of the DC power source 7b or less, and outputs it so as to be inputted into the inverter circuit 4b. In addition, FIG. 9B and FIG. 9D are the diagrams that show the voltage (input voltage) V2 and voltage (output voltage) V1 of the bidirectional buck-boost converter 5a on the power reception side; as it can be understood from the diagrams that the bidirectional buck-boost converter 5a on the power reception side converts electric power outputted from the inverter circuit 4a operating as a diode bridge to the voltage V1 which is the voltage (output voltage) V2 of the inverter circuit 4a or more, and supplies it to the resistor 71a corresponding to a DC power source. Note that, the smaller the coefficient of coupling is, the lower voltage the electric power is converted to in the bidirectional buck-boost converter 5b on the power transmission side and is transmitted therefrom, and the higher voltage the electric power is converted to in the bidirectional buck-boost converter 5a on the power reception side and is received thereinto.

Figure 10:
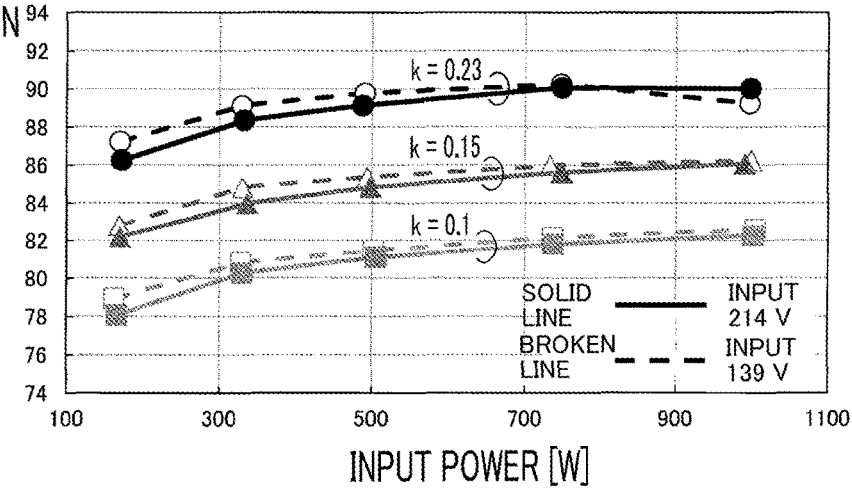
FIG. 10 is a diagram showing experimental results of electric power transmission efficiencies in the bidirectional non-contact power supply system at the time of a V2G electric power supply.

FIG. 10 is a diagram showing electric power transmission efficiencies at the time of a V2G electric power supply shown by the experimental results of FIG. 9A, FIG. 9B, FIG. 9C and FIG. 9D. The results are shown by the solid lines when the voltage of the DC power source 7b is at 214 V; and the results, by the broken lines when it is at 139 V. According to the bidirectional non-contact power supply system using the bidirectional non-contact power supply devices of the embodiment as shown in FIG. 10, it can be understood that electric power transmission can be performed with a high electric power transmission efficiency also in the V2G electric power supply.

As described above based on the experimental results, the bidirectional non-contact power supply system using the bidirectional non-contact power supply devices of the embodiment performs non-contact power supplies in both of the G2V electric power supply and the V2G electric power supply, so that it can be understood that a bidirectional non-contact power supply can be performed with the high electric power transmission efficiencies. That is, according to the bidirectional non-contact power supply devices of the present invention, an effect can be achieved as obtaining a bidirectional non-contact power supply system with a high electric power transmission efficiency. In addition, because it is not necessary to provide two capacitors connected in series and parallel with a coil, and switches for changing over connection methods, as in a bidirectional non-contact power supply device described in Japanese Laid-Open Patent Publication No. 2012-244635, the device can be small-sized, so that an effect can be achieved as obtaining a bidirectional non-contact power supply device with higher reliability.

Embodiment 2

Figure 11:
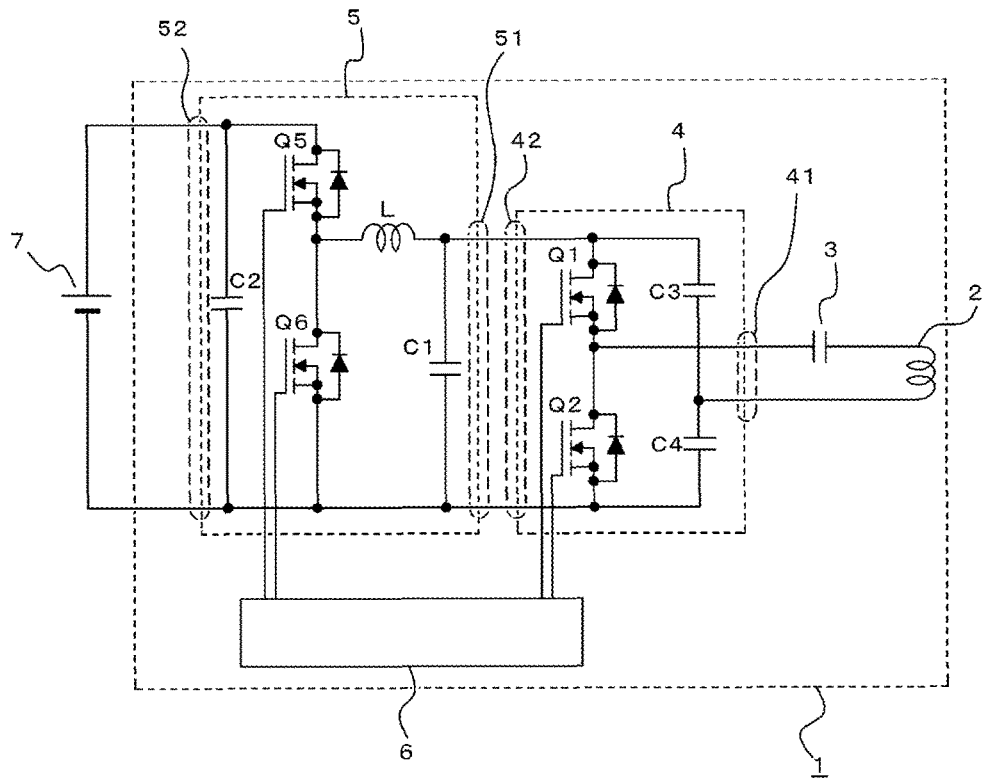
FIG. 11 is a circuit diagram illustrating a bidirectional non-contact power supply device according to Embodiment 2 of the present invention.

FIG. 11 is a circuit diagram illustrating a bidirectional non-contact power supply device according to Embodiment 2 of the present invention. The bidirectional non-contact power supply device 1 of Embodiment 2 differs from that of Embodiment 1 in the inverter circuit 4; the inverter circuit 4 is made of a half-bridge circuit.

The inverter circuit 4 of the bidirectional non-contact power supply device 1 of FIG. 11 differs from the inverter circuit 4 of the bidirectional non-contact power supply device 1 of FIG. 2 depicted in Embodiment 1; the difference lies in a point where capacitors C3 and C4 are provided in place of the semiconductor switching devices Q3 and Q4 of FIG. 2. Namely, in the inverter circuit 4 of FIG. 11, a leg of the semiconductor switching devices Q1 and Q2 connected in series is connected in parallel with a leg of the capacitors C3 and C4 connected in series, and the midpoint of the semiconductor switching devices Q1 and Q 2, and the midpoint of the capacitors C3 and C4 are connected on the first input-output end 41 of the inverter circuit 4. Such a circuit configuration is referred to as a half-bridge circuit.

At the time of operating as an electric power transmission device, in a case in which its inverter circuit 4 made of a half-bridge circuit operates with the duty ratio set at the maximum of 50%, half of the average voltage to a voltage inputted on the second input-output end 42 is outputted from the first input-output end 41. On the other hand, at the time of operating as an electric power reception device, the semiconductor switching devices Q1 and Q2 are turned off so that full-wave rectification is performed by means of feedback diodes; however, it is so arranged that the configuration of FIG. 11 takes a configuration of a voltage-doubler rectifier circuit, and so a two-fold voltage to the average voltage inputted on the first input-output end 41 is outputted from the second input-output end 42.

In the bidirectional non-contact power supply device of the embodiment, a voltage of DC power being inputted is stepped down in voltage and converted into an alternating current, which is supplied to the coil, at the time of operating as an electric power transmission device. In addition, at the time of operating as an electric power reception device, AC power being received by the coil is converted into a direct current and stepped up in voltage, which is supplied to a DC power source corresponding to a load. Because the half-bridge circuit performs the operation to step down a voltage at the time of electric power transmission, and performs the operation to step up a voltage at the time of electric power reception, the circuitry conforms with the operation concept of the present invention.

For this reason, when the inverter circuit 4 is made of a half-bridge circuit in such a manner in the embodiment, it is not required to increase a buck voltage ratio at the time of electric power transmission and a boost voltage ratio at the time of electric power reception in the bidirectional buck-boost converter 5, and switching losses of the bidirectional buck-boost converter 5 can be reduced. However, because a half-bridge circuit provides smaller electric power capacity in comparison with that by a full-bridge circuit, the bidirectional non-contact power supply device of Embodiment 2 is suitable for small-size bidirectional non-contact power supply devices.

Figure 12:
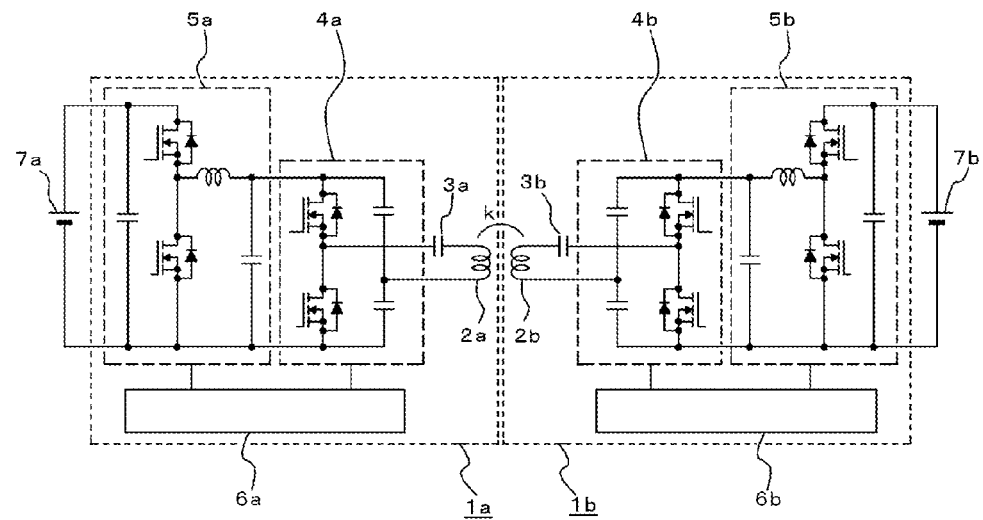
FIG. 12 is a circuit diagram illustrating a bidirectional non-contact power supply system according to the bidirectional non-contact power supply devices in Embodiment 2 of the present invention.

FIG. 12 is a circuit diagram illustrating a bidirectional non-contact power supply system which uses two of the bidirectional non-contact power supply devices 1 illustrated in FIG. 11. By making an arrangement in which the coil 2a of the bidirectional non-contact power supply device 1a and the coil 2b of the bidirectional non-contact power supply device 1b are magnetically coupled to each other with a coupling coefficient k, electric power can be supplied from the bidirectional non-contact power supply device 1a to the bidirectional non-contact power supply device 1b, and, reversely, electric power can be supplied from the bidirectional non-contact power supply device 1b to the bidirectional non-contact power supply device 1a. Note that, the inverter circuits 4a and 4b, and the bidirectional buck-boost converters 5a and 5b are constituted of the semiconductor switching devices Q1, Q2, Q5, Q6 and the like similarly to the inverter circuit 4 and the bidirectional buck-boost converter 5 shown in FIG. 11.

In this case also, as demonstrated in Embodiment 1, each of the bidirectional buck-boost converters 5a and 5b operates as a buck converter at the time of electric power transmission, and operates as a boost converter at the time of electric power reception. Namely, the bidirectional buck-boost converters 5a and 5b operate as described in Embodiment 1.

Figure 13:
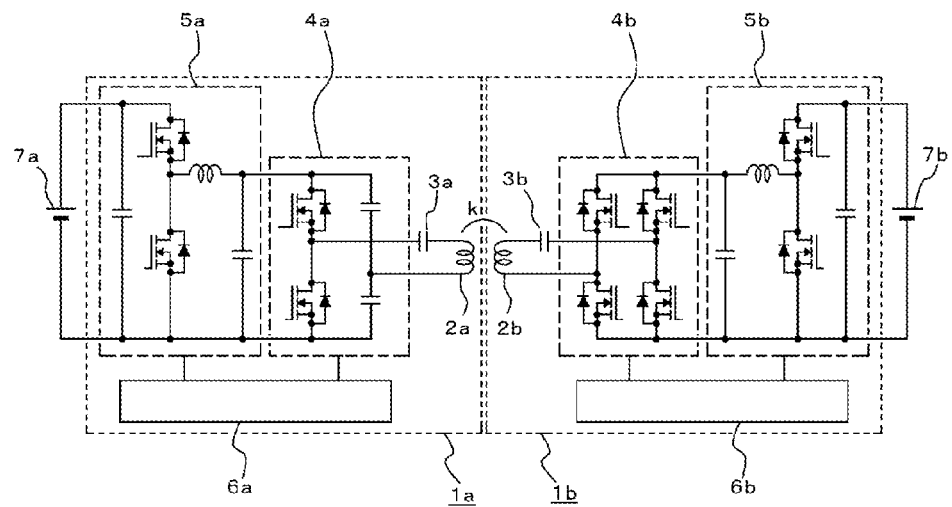
FIG. 13 is a circuit diagram illustrating another bidirectional non-contact power supply system according to the bidirectional non-contact power supply device in Embodiment 2 of the present invention.

FIG. 13 is a circuit diagram illustrating another bidirectional non-contact power supply system which uses the bidirectional non-contact power supply device of Embodiment 2 and the bidirectional non-contact power supply device of Embodiment 1. In the bidirectional non-contact power supply device 1a, the inverter circuit 4a is made of a half-bridge circuit, and, in the bidirectional non-contact power supply device 1b, the inverter circuit 4b is made of a full-bridge circuit. Note that, the inverter circuit 4a and the bidirectional buck-boost converter 5a are constituted of the semiconductor switching devices Q1 , Q2, Q5, Q6 and the like similarly to the inverter circuit 4 and the bidirectional buck-boost converter 5 shown in FIG. 11; and, in addition, the inverter circuit 4b and the bidirectional buck-boost converter 5b are constituted of the semiconductor switching devices Q1 through Q6 and the like similarly to the inverter circuit 4 and the bidirectional buck-boost converter 5 shown in FIG. 2.

Even in the bidirectional non-contact power supply system which combines the bidirectional non-contact power supply devices having different circuit configurations from each other as illustrated in FIG. 13, a non-contact power supply can be achieved in both directions; in this case also as described above, the bidirectional buck-boost converters 5a and 5b each operate as a buck converter at the time of operating as an electric power transmission device, and operates as a boost converter at the time of operating as an electric power reception device.

Embodiment 3.

Figure 14:
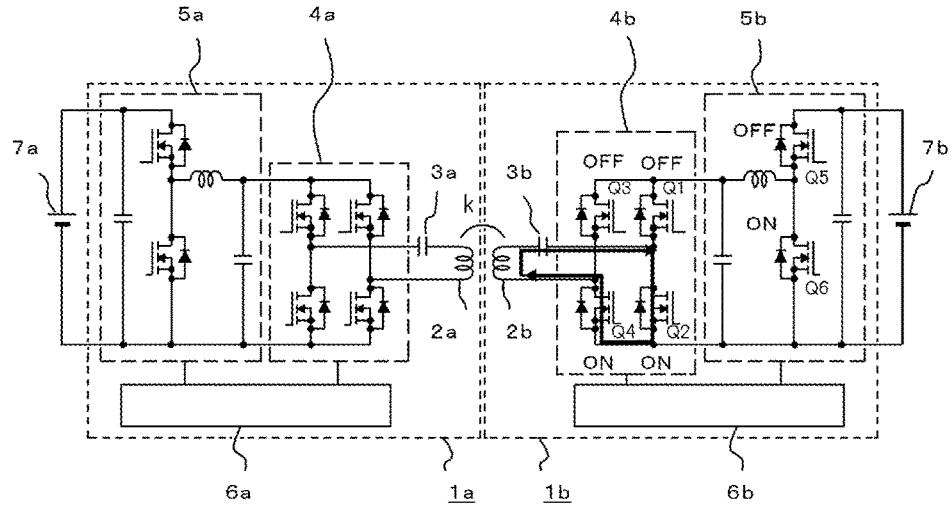
FIG. 14 is an illustrative circuit diagram for explaining part of control states of bidirectional non-contact power supply devices in a bidirectional non-contact power supply system according to Embodiment 3 of the present invention.
Figure 15:
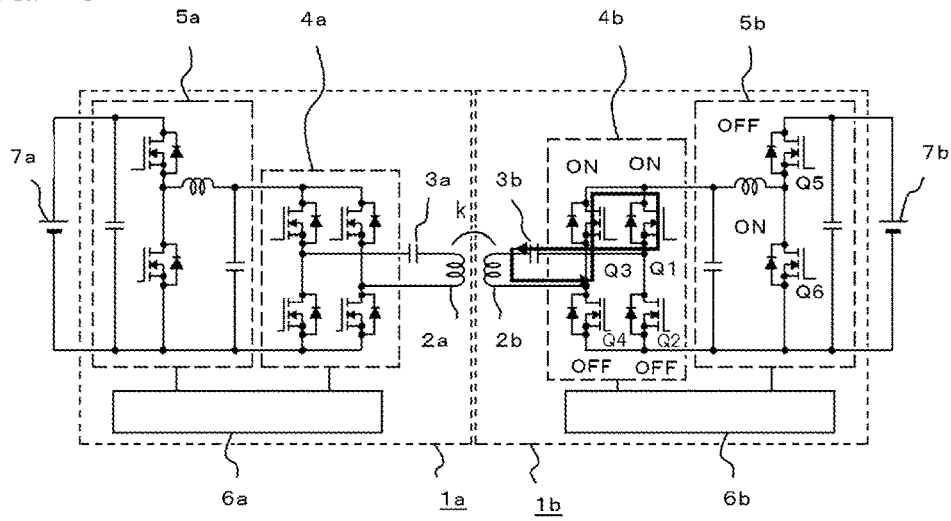
FIG. 15 is an illustrative circuit diagram for explaining part of control states of the bidirectional non-contact power supply devices in the bidirectional non-contact power supply system according to Embodiment 3 of the present invention.
Figure 16:
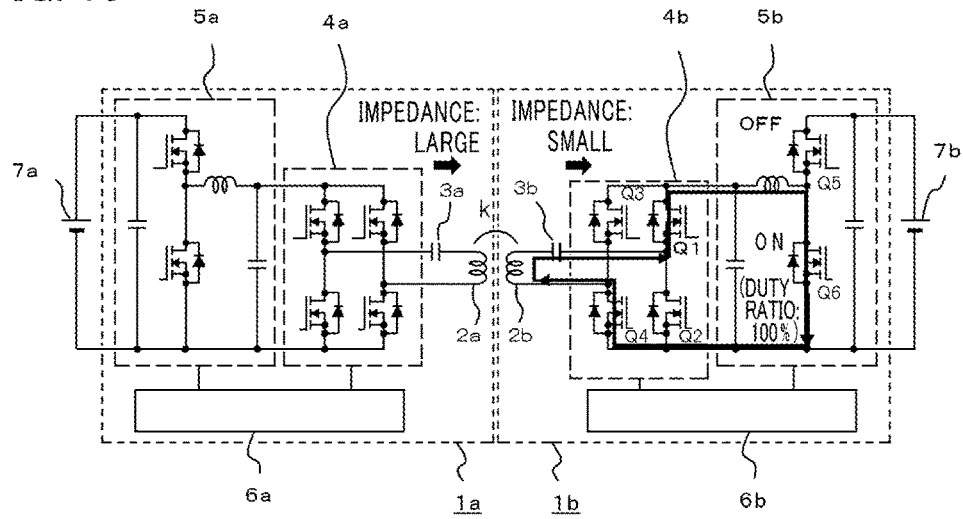
FIG. 16 is an illustrative circuit diagram for explaining part of control states of the bidirectional non-contact power supply devices in the bidirectional non-contact power supply system according to Embodiment 3 of the present invention.

FIG. 14 through FIG. 16 are illustrative circuit diagrams each for explaining control states of bidirectional non-contact power supply devices in a non-contact power supply system according to Embodiment 3 of the present invention, and are the illustrative diagrams each for explaining control at a time of emergency in which the bidirectional non-contact power supply devices of the present invention has. Each of the diagrams shows a control state of each of the semiconductor switching devices in the bidirectional non-contact power supply devices. Note that, the circuit configurations each are similar to the bidirectional non-contact power supply system according to the bidirectional non-contact power supply devices in Embodiment 1 illustrated in FIG. 3.

In a state shown in FIG. 14, the second bidirectional non-contact power supply device 1b on the right-hand side of the figure performs an electric power reception operation. When an electric current flows through the coil 2b, the capacitor 3b and the inverter circuit 4b in the direction along the arrows (also referred to as a "positive direction") indicated in FIG. 14, the semiconductor switching devices Q2 and Q4 being the lower-side semiconductor switching devices of both legs of the inverter circuit 4b made of a full-bridge circuit are turned on and the semiconductor switching devices Q1 and Q3 being the upper-side semiconductor switching devices are turned off, and the lower-stage boost-operation semiconductor switching device Q6 of the bidirectional buck-boost converter 5b is turned on and the upper-stage buck-operation semiconductor switching device Q5 thereof is turned off.

In addition, when an electric current flows through in the direction along the arrows (also referred to as a "negative direction") indicated in FIG. 15, the semiconductor switching devices Q1 and Q3 being the upper-side semiconductor switching devices of both legs of the inverter circuit 4b made of a full-bridge circuit are turned on and the semiconductor switching devices Q2 and Q4 being the lower-side semiconductor switching devices are turned off, and the lower-stage boost-operation semiconductor switching device Q6 of the bidirectional buck-boost converter 5b is turned on and the upper-stage buck-operation semiconductor switching device Q5 thereof is turned off.

The bidirectional non-contact power supply device of the present invention transfers with specific timing to the control mode described above. The explanation will be made for a case in which the control mode is required and for its effect.

Because, in a non-contact power supply device, a power transmission side and a power reception side are not connected through wire or cable, there arises a problem in a quick power interruption at a time when a trouble is caused.

For example, at a time of abnormality on a power reception side, request is made by means of radio communications from the power reception side to a power transmission side so as to stop electric power; and, in regard to the power reception side, the electric power supply on the power transmission side is stopped or reduced after having received the communications.

Because, in the non-contact power supply device, radio communications are used on the power transmission side and on the power reception side, it is feared that a circuit on the power reception side may be broken in the duration from the power interruption request on the power reception side until an actual power interruption.

In addition, similarly, it is feared that excessively large electric power is produced on the power reception side to cause breakage thereto due to a timing of abnormality on the power transmission side, a communication error and the like.

A protection and control mode being the control mode according to Embodiment 3 has an effect in avoiding the breakage to the bidirectional non-contact power supply device due to excessively large electric power at the time of electric power reception operation.

As described in Embodiment 1, because the configuration is taken on which the coil performing reception of electric power and the capacitor are connected in series, the impedance viewed from the inverter circuit on the power transmission side is inversely proportional to the impedance viewed from the electric power reception coil. Therefore, in the bidirectional non-contact power supply device at the time of electric power reception operation, an output impedance of the inverter circuit on the power transmission side can be made larger at a time when electric power reception starts, by setting the duty ratio of the boost-operation semiconductor switching device Q6 of the bidirectional buck-boost converter at 100% at the time of its turn-on. The state is shown in FIG. 16.

That is, without a communication instruction, transmission power can be forcefully lowered only by the operations on the power reception side.

In addition, according to this operation, the flow of electric current into a battery is eliminated, and thus it is also possible to prevent an excessively large electric power supply into a circuit, a battery and the like downstream of the bidirectional non-contact power supply device.

However, in a case involving only a turn-on operation of the semiconductor switching device Q6 of the bidirectional buck-boost converter 5b and in a case in which electric power is continuously supplied from a power transmission side, it would be probable that, depending on a parameter of inductance or the like, an excessively large electric current flows through a boost reactor (comparable to the reactor L in FIG. 2) and the semiconductor switching device Q6.

In order to reduce a value of an electric current which flows at this time, it is required to reduce a voltage across a capacitor (comparable to the capacitor C2 in FIG. 2) upstream of the bidirectional buck-boost converter, and is required to halt electric current inflow from the inverter circuit functioning as a diode bridge.

Here, by turning on and off the semiconductor switching devices of the inverter circuit in following with an orientation of electric current as shown in FIG. 14 and FIG. 15, the electric current is made to loop within the inverter circuit, thereby the electric current can be prevented from flowing in along a direction toward the bidirectional buck-boost converter.

In addition, because the impedance viewed from the electric power reception coil becomes small also at this time, the output impedance viewed from the inverter circuit on the power transmission side becomes large, so that an effect can be achieved as forcefully reducing the electric power.

As described above, by combining the switching operation of the inverter circuit and that of the bidirectional buck-boost converter, electric power on the power transmission side can be forcefully reduced without interposing the communications also at a time when abnormality occurs, and, in addition, a breakage risk due to excessively large voltages and electric currents can be mitigated.

In the present invention, each of the embodiments can be freely combined, and/or each of the embodiments can be appropriately modified or eliminated without departing from the scope of the invention.

What is claimed is:

1. A bidirectional non-contact power supply device in which a self coil being coupled with an other coil through a magnetic field coupling therebetween for performing electric power transmission to the other coil or performing electric power reception from the other coil, and a capacitor being connected in series with the self coil are connected to a first input-output end in an inverter circuit; a first input-output end in a bidirectional buck-boost converter is connected to a second input-output end in the inverter circuit; and a DC power source is connected to a second input-output end in the bidirectional buck-boost converter, wherein in the bidirectional non-contact power supply device:

the bidirectional buck-boost converter includes an upper-stage semiconductor switching device used at a time of buck operation, and a lower-stage semiconductor switching device used at a time of boost operation; the bidirectional buck-boost converter converts, at a time of electric power transmission, electric power supplied from the DC power source to a voltage of the DC power source or less whose voltage is inputted into the inverter circuit; the bidirectional buck-boost converter converts, at a time of electric power reception, electric power outputted from the inverter circuit to an output voltage of the inverter circuit or more whose output voltage is supplied to the DC power source; the bidirectional buck-boost converter controls, at a time of electric power reception, the lower-stage semiconductor switching device so that its duty ratio is gradually made smaller from a duty ratio at a time when the electric power reception starts; and the bidirectional buck-boost converter controls, after electric output power to the DC power source reaches an instruction value determined in advance, the duty ratio of the lower-stage semiconductor switching device so that the electric output power thereto is maximized.

2. The bidirectional non-contact power supply device as set forth in claim 1, wherein the bidirectional buck-boost converter controls, at a time of starting electric power reception, to turn off the upper-stage semiconductor switching device used for buck operation and also to set a duty ratio of the lower-stage semiconductor switching device used for boost operation at 100 percent, and controls the duty ratio thereof so as to be gradually made smaller.

3. The bidirectional non-contact power supply device as set forth in claim 1, wherein
the bidirectional buck-boost converter
controls, after electric power reception is started and electric output power therefrom to the DC power source reaches a value of electric power determined in advance, so that the electric output power thereto is maximized using a hill-climbing method, and controls so that electric power inputted into the bidirectional buck-boost converter or into the inverter circuit is made constant at a time of electric power transmission.

4. The bidirectional non-contact power supply device as set forth in claim 1, wherein
the inverter circuit is made of a full-bridge circuit constituted of semiconductor switching devices each having a feedback diode;
the bidirectional buck-boost converter has a control mode in which, at a time of electric power reception in a state in which the lower-stage semiconductor switching device is turned on and the upper-stage semiconductor switching device is turned off, when defining as a positive direction a direction of an electric current flowing from the capacitor connected in series with the self coil into the inverter circuit made of the full-bridge circuit and defining as a negative direction a direction of an electric current flowing from the self coil into the inverter circuit made of the full-bridge circuit, lower-side semiconductor switching devices of the inverter circuit made of the full-bridge circuit are turned on, and upper-side semiconductor switching devices of the inverter circuit made of the full-bridge circuit are turned off, when an electric current flows toward the positive direction; and the upper-side semiconductor switching devices of the inverter circuit made of the full-bridge circuit are turned on, and the lower-side semiconductor switching devices of the inverter circuit made of the full-bridge circuit are turned off, when an electric current flows toward the negative direction.

5. A bidirectional non-contact power supply system, comprising
the bidirectional non-contact power supply devices as set forth in claim 1 as a first bidirectional non-contact power supply device and a second bidirectional non-contact power supply device, wherein
a self coil of the first bidirectional non-contact power supply device and a self coil of the second bidirectional non-contact power supply device are magnetically coupled with each other.

* * * * *